US007949354B2

(12) United States Patent  
Amirijoo et al.

(10) Patent No.: US 7,949,354 B2  
(45) Date of Patent: May 24, 2011

(54) METHOD AND APPARATUS FOR SHARING TRANSPORT CHANNEL FOR NODE SERVING PLURAL CELLS WITH MULTIMEDIA BROADCAST/MULTICAST

(75) Inventors: Sharokh Amirijoo, Sollentuna (SE); Tarmo Kuningas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 11/555,336

(22) Filed: Nov. 1, 2006

(65) Prior Publication Data

US 2008/0102811 A1    May 1, 2008

(51) Int. Cl.
 *H04W 4/00* (2009.01)
 *H04W 24/00* (2009.01)
(52) U.S. Cl. .......................... 455/466; 455/424
(58) Field of Classification Search .................. 455/450, 455/424

See application file for complete search history.

(56) References Cited

U.S. PATENT DOCUMENTS

| | | | |
|---|---|---|---|
| 6,331,983 B1 | 12/2001 | Haggerty et al. | |
| 6,745,035 B2 * | 6/2004 | Kanemoto et al. | 455/450 |
| 2002/0126664 A1 | 9/2002 | Kiiski et al. | |
| 2003/0161284 A1 | 8/2003 | Chen | |
| 2003/0174678 A1 | 9/2003 | Chang et al. | |
| 2004/0022218 A1 * | 2/2004 | Kim et al. | 370/335 |
| 2004/0184471 A1 * | 9/2004 | Chuah et al. | 370/420 |
| 2005/0043045 A1 | 2/2005 | Cheng et al. | |
| 2006/0089150 A1 * | 4/2006 | Agin | 455/453 |
| 2007/0086457 A1 | 4/2007 | Rune et al. | |

FOREIGN PATENT DOCUMENTS

| | | |
|---|---|---|
| EP | 1073297 A2 | 7/2000 |
| EP | 1 387 591 A1 | 2/2004 |
| EP | 1404068 | 3/2004 |
| EP | 1 748 658 A1 | 1/2007 |
| WO | 03/049482 | 6/2003 |
| WO | 03/090417 | 10/2003 |
| WO | 2004/017580 A1 | 2/2004 |

(Continued)

OTHER PUBLICATIONS

International Preliminary Report on Patentability mailed May 14, 2009 in corresponding PCT Application No. PCT/SE2007/050790.

(Continued)

*Primary Examiner* — Pierre-Louis Desir  
*Assistant Examiner* — Timothy Pham  
(74) *Attorney, Agent, or Firm* — Nixon & Vanderhye, P.C.

(57) ABSTRACT

A radio access network (11) facilitates transmission of a Multimedia Broadcast/Multicast Service to plural user equipment units served by a radio base station. A radio network controller node (26) includes in a first message (70) of a Common Transport Channel Setup procedure an indication that sharing of a common transport bearer (60) involved in a session of the Multimedia Broadcast/Multicast Service is allowed. A radio base station (28) makes a determination whether to share the common transport bearer (60) among user equipment units (30) situated in plural cells (C) served by the radio base station (28). If the determination is positive, the radio base station (28) includes in a second message (80) of the Common Transport Channel Setup procedure an identification of an already-established channel to be used as the shared common transport bearer. The radio network controller (26) then uses the already-established channel as the shared common transport bearer for transmitting Multimedia Broadcast/Multicast Service user data to user equipment units (30) situated in plural cells served by the radio base station.

33 Claims, 6 Drawing Sheets

FOREIGN PATENT DOCUMENTS

| WO | 2004/043023 A1 | 5/2004 |
|---|---|---|
| WO | 2005/018116 A1 | 2/2005 |
| WO | 2006/080818 A1 | 8/2006 |

OTHER PUBLICATIONS

Yuan Qi, "Study on IP multicast routing protocol", Telecommunications Network Technology, No. 1, Feb. 2001.

U.S. Office Action mailed May 7, 2008 in U.S. Appl. No. 10/583,958.

U.S. Office Action mailed Oct. 14, 2008 in U.S. Appl. No. 10/583,958.

U.S. Office Action mailed Mar. 2, 2009 in U.S. Appl. No. 10/583,958.

U.S. Office Action mailed Nov. 17, 2009 in U.S. Appl. No. 10/583,958.

International Search Report and Written Opinion mailed Apr. 9, 2008 in corresponding PCT application PCT/SE2007/050790.

3GPP TS 25.346 V7.2.0 (Sep. 2006), 3rd Generation Partnership Project, Technical Specification Group Radio Access Network, Introduction of the Multimedia Broadcast Multicast Service (MBMS) in the Radio Access Network (RAN), Stage 2, (Release 7).

3GPP TS 22.246: V6.3.0 (Mar. 2006) $3^{rd}$ Generation Partnership Project; Technical Specification Group Services and System Aspects; "Multimedia Broadcast/Multicast Service; Stage 1" (Release 6).

3GPP TS 23.246: V6.10.0 (Jun. 2006), $3^{rd}$ Generation Partnership Project; Technical Specification Group Services and System Aspects; "Multimedia Broadcast Multicast Service; Architecture and Functional Description" (Release 6).

3GPP TR 25.992: V6.0.0 (Sep. 2003) $3^{rd}$ Generation Partnership Project; Technical Specification Group Radio Access Network; "Multimedia Broadcast Multicast Service (MBMS); UTRAN/GERAN Requirements".

3GPP TS 33.246: V6.8.0 (Sep. 2006) $3^{rd}$ Generation Partnership Project; Technical Specification Group Services and System Aspects; "3G Security; Security of Multimedia Broadcast/Multicast Service (MBMS)" (Release 6).

3GPP TS 22.146 V8.1.0 (Sep. 2006) $3^{rd}$ Generation Partnership Project; Technical Specification Group Services and System Aspects; Multimedia Broadcast/Multicast Service; Stage 1 (Release 8).

3GPP TS 25.433 V7.1.0 (Jun. 2000), 3rd Generation Partnership Project, Technical Specification Group Radio Access Network, UTRAN Iub interface Node B Application Part (NBAP) signaling, (Release 7).

\* cited by examiner

METHOD AND APPARATUS FOR SHARING TRANSPORT CHANNEL FOR NODE SERVING PLURAL CELLS WITH MULTIMEDIA BROADCAST/MULTICAST

BACKGROUND

I. Technical Field

This invention pertains to telecommunications, and particularly to the transport of user data in a Multimedia Broadcast/Multicast (MBM) session.

II. Related Art and Other Considerations

The Multimedia Broadcast/Multicast Service (MBMS) is a point-to-multipoint service in which data is transmitted from a single source entity to multiple recipients. Transmitting the same data to multiple recipients allows network resources to be shared.

Multimedia Broadcast/Multicast Service (MBMS) is described in one or more of the following (all of which are incorporated herein by reference in their entirety):

3GPP TS 25.433 V7.1.0 (2006-06), 3rd Generation Partnership Project, Technical Specification Group Radio Access Network, UTRAN Tub interface Node B Application Part (NBAP) signaling, (Release 7) [hereinafter, "3GPP TS 25.433 V7. 1.0"];

3GPP TS 25.346 V7.2.0 (2006-09), 3rd Generation Partnership Project, Technical Specification Group Radio Access Network, Introduction of the Multimedia Broadcast Multicast Service (MBMS) in the Radio Access Network (RAN), Stage 2, (Release 7);

3GPP TS 22.146: "Multimedia Broadcast/Multicast Service; Stage 1";

3GPP TS 22.246: "MBMS User Services; Stage 1";

3GPP TS 23.246: "Multimedia Broadcast Multicast Service; Architecture and Functional Description";

3GPP TR 25.992: "Multimedia Broadcast Multicast Service (MBMS); UTRAN/GERAN Requirements";

3GPP TS 33.246: "3G Security; Security of Multimedia Broadcast/Multicast Service (MBMS)".

FIG. 1 illustrates an example telecommunications system 110 which facilitates a Multimedia Broadcast/Multicast Service (MBMS). The telecommunications system 110 includes a radio access network (RAN) 111. A MBMS Service Context (BM-SC) 112 contains the necessary information for the radio access network (RAN) 111 to control the MBMS service in radio access network (RAN) 111. The MBMS Service Context (BM-SC) 112 is connected through a core network (CN) 114 to the radio access network (RAN) 111. The core network 114 can comprise a Gateway GPRS Support Node (GGSN) and, in some implementations, a SGSN node (with the SGSN node connected between the GGSN node and the radio access network (RAN) 111). Alternatively, in the case of a "one tunnel" implementation, the user plane might not go via SGSN but the control plane always does.

The radio access network (RAN) 111, which can be a Universal Mobile Telecommunications (UMTS) Terrestrial Radio Access Network (UTRAN), comprises a radio network controller (RNC) node 126 and at least one radio base station node, also known as a "Node-B" or "B Node" 128 (see FIG. 2). The Node-B 128 can serve one or more cells, cells $C_1$ through $C_3$ being illustrated in FIG. 1 and FIG. 2. User equipment units (UEs) 30, also known as mobile stations or mobile terminals, communicate with Node-B 128 over a radio or air interface using a respective cell.

The Multimedia Broadcast/Multicast Service (MBMS) utilizes several types of bearers. An MBMS Iu data bearer is the data bearer established between a core network 114 (such as a SGSN node or GGSN node) and radio network controller (RNC) node 126 to transport MBMS data. A MBMS radio bearer is the data bearer established between the radio network controller (RNC) node 126 and the user equipment units 130 to transport MBMS data. A MBMS RAB refers both to the MBMS Iu data bearer and the MBMS radio bearer.

A Multimedia Broadcast/Multicast Service (MBMS) session has several channels, including the following: MCCH (MBMS point-to-multipoint Control Channel); MICH (MBMS Notification Indicator Channel); MSCH (MBMS point-to-multipoint Scheduling Channel); and MTCH (MBMS point-to-multipoint Traffic Channel). FIG. 1 shows a MTCH 134 between radio network controller (RNC) node 126 and each illustrated cell, FIG. 2 shows that a MTCH 134 exists between Node-B 128 and each cell served by the Node-B 128.

FIG. 2 shows an Tub bearer 136 which exists over an Tub interface, i.e., over an interface between radio network controller (RNC) node 126 and Node-B 128. A FACH transport channel mechanism is used over the Tub interface for Tub bearer 136.

A Multimedia Broadcast/Multicast Service (MBMS) session is started by a MBMS Session Start Request message sent from a core network node to radio network controller (RNC) node 126. The MBMS Session Start Request message includes such information as the MBMS Service ID, the MBMS Bearer Service Type and MBMS Session Attributes. The MBMS Session Start Request message triggers the radio network controller (RNC) node 126 to notify the user equipment units 130 (i.e., the user equipment units which have activated the MBMS Service) of the MBMS Session Start. The MBMS Session Start Request message contains the information necessary to setup the MBMS RAB.

Upon receiving the MBMS Session Start Request, the radio network controller (RNC) node 126 performs numerous activities, including execution of a NBAP (Node B Application Part) protocol. The NBAP (Node B Application Part) protocol provides, among other functions, Common Transport Channel Management. This function gives the CRNC (e.g., the radio network controller (RNC) node 126 in the illustrated scenario) the possibility to manage the configuration of Common Transport Channels in a Node B. Elementary procedures controlled by the Common Transport Channel Management include a Common Transport Channel Setup Procedure; a Common Transport Channel Reconfiguration Procedure, and a Common Transport Channel Deletion Procedure.

The Common Transport Channel Setup Procedure is described, e.g., 3GPP TS 25.433 V7.1.0 §8.2.1. The Common Transport Channel Setup Procedure is used for establishing the necessary resources in Node B, regarding Secondary CCPCH, PICH, PRACH, AICH [FDD], FACH, PCH, RACH and FPACH [1.28 Mcps TDD]. Messages included in the Common Transport Channel Setup Procedure include a COMMON TRANSPORT CHANNEL SETUP REQUEST message; a COMMON TRANSPORT CHANNEL SETUP RESPONSE message; and a COMMON TRANSPORT CHANNEL SETUP FAILURE message. The Common Transport Channel Setup Procedure is initiated with the COMMON TRANSPORT CHANNEL SETUP REQUEST message sent from the CRNC to the Node B using the Node B Control Port.

The COMMON TRANSPORT CHANNEL SETUP REQUEST message is described, e.g., in §9.1.3 of 3GPP TS 25.433 V7.1.0 (2006-06). If the COMMON TRANSPORT CHANNEL SETUP REQUEST message contains a FACH Parameters IE, the Node B shall configure and activate the indicated FACH(s) according to the COMMON TRANSPORT CHANNEL SETUP REQUEST message. If the COMMON TRANSPORT CHANNEL SETUP REQUEST message includes the Transport Layer Address and Binding ID IEs, the Node B may use the transport layer adress and the binding identifier received from the CRNC when establishing a transport bearer for the indicated common transport channels.

After successfully configuring the requested common transport channels and the common physical channels, the Node B stores the value of Configuration Generation ID IE and it shall respond with the COMMON TRANSPORT CHANNEL SETUP RESPONSE message with the Common Transport Channel ID IE, the Binding ID IE and the Transport Layer Address IE for the configured common transport channels.

A separate Common transport channel Setup procedure is required to establish MTCHs in different cells. In other words, if MTCHs to be establish in three cells $C_1$-$C_3$ served by the same Node-B, then three separate Common Transport Channel Setup Request messages are initiated by the radio network controller node, one such message for each cell. Thus, FIG. 2 shows existence of three common transport channels $136_1$, $136_2$, and $136_3$ between radio network controller (RNC) node 126 and Node-B 128. These common transport channels 136 are also know as MBMS Tub bearers and, for conventional practice, essentially correspond to the three MTCHs.

Thus, presently there is one common transport channel 136 for each cell C served by Node-B 128. In other words, common transport channel $136_1$ is associated with cell $C_1$, common transport channel $136_2$ is associated with cell $C_2$, and common transport channel $136_3$ is associated with cell $C_3$. Thus, as depicted in FIG. 2, currently there is a need for radio network controller (RNC) node 126 to establish dedicated Tub transport resources including a dedicated Tub bearer 136 (used to carry the same MBMS user data session) for each of different cells controlled by the same Node B.

What is needed, therefore, and an object of the invention, is one or more of methods, techniques, and apparatus for efficiently providing MBMS user data transport to a Node-B which serves plural cells.

BRIEF SUMMARY

One aspect of the technology concerns a method of operating a radio access network for facilitating transmission of a Multimedia Broadcast/Multicast Service to plural user equipment units served by a radio base station. The method comprises including in a first message of a Common Transport Channel Setup procedure from a radio network controller node to the radio base station an indication that sharing of a common transport bearer involved in a session of the Multimedia Broadcast/Multicast Service is allowed. The method further comprises making a determination (at the radio base station) whether to share the common transport bearer among user equipment units situated in plural cells served by the radio base station. If the determination is positive, the radio base station includes in a second message of the Common Transport Channel Setup procedure sent from the radio base station to the radio network controller an identification of an already-established channel to be used as the shared common transport bearer. The radio network controller then uses the already-established channel as the shared common transport bearer for transmitting Multimedia Broadcast/Multicast Service user data to user equipment units situated in plural cells served by the radio base station.

In an example embodiment, the radio base station makes its determination by (a) determining whether there already exists an established FACH channel for the session of the Multimedia Broadcast/Multicast Service, and (b) determining whether to share the already-established channel based on internal hardware and/or software structure of the radio base station.

In an example implementation, the identification of the already-established channel returned by the radio base station to the radio network controller includes either (a) a cell ID (e.g., an information element found in 3GPP TS 25.433) and common transport channel ID of the already-established channel; or (b) a transport layer address and binding information for the already-established channel.

In an example implementation, the radio network controller (RNC) includes an information element in the first message of a Common Transport Channel Setup procedure to indicate that the sharing of the common transport bearer is allowed. Further, the radio base station includes in an information element of the second message of the Common Transport Channel Setup procedure the identification of the already-established channel to be used as the shared common transport bearer.

Another aspect of the technology concerns a radio network controller node configured to indicate in a first message of a Common Transport Channel Setup procedure from a radio network controller node to a radio base station that sharing of a common transport bearer involved in a session of the Multimedia Broadcast/Multicast Service is allowed and, upon receiving a predetermined response to the first message, to use the already-established channel as the shared common transport bearer for transmitting Multimedia Broadcast/Multicast Service user data to user equipment units situated in plural cells served by the radio base station.

Another aspect of the technology concerns a radio base station of a radio access network configured to determine whether a common transport bearer utilized in a Multimedia Broadcast/Multicast Service can be shared among user equipment units situated in plural cells served by the radio base station and, if the determination is positive, to indicate in a message of a Common Transport Channel Setup procedure sent from the radio base station to the radio network controller an identification of an already-established channel to be used as the shared common transport bearer.

Another aspect of the technology concerns a radio access network utilized in conjunction with a Multimedia Broadcast/Multicast Service. The radio access network (RAN) comprises a radio base station and a radio network controller node. The radio network controller node is configured to indicate in a first message of a Common Transport Channel Setup procedure from the radio network controller node to the radio base station that sharing of a common transport bearer involved in a session of the Multimedia Broadcast/Multicast Service is allowed. The radio base station is configured to make a determination whether to share the common transport bearer among user equipment units situated in plural cells served by the radio base station; and, if the determination is positive, to include in a second message of the Common Transport Channel Setup procedure sent from the radio base station to the radio network controller an identification of an already-established channel to be used as the shared common transport bearer.

Thus, the technology provides means and methods (e.g., control plane method) to use same Tub user plane and transport resources for same MBMS session in different cells controlled by the radio base station, e.g., by the Node B. In this case Node B transmits the received Iub frames on the MBMS transport channel (MTCH) in multiple cells.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 3:
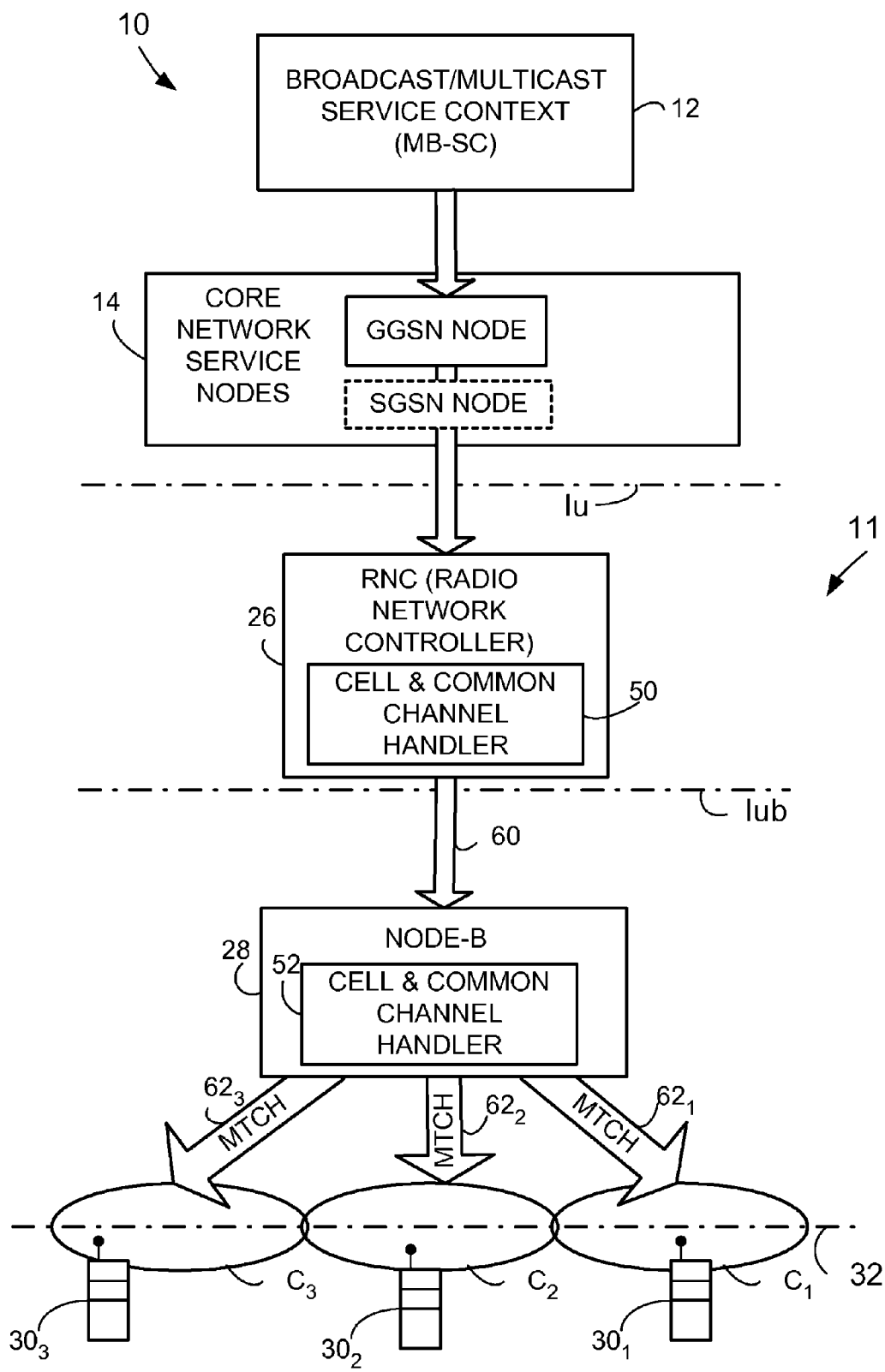
FIG. 3 is diagrammatic view of an example telecommunications system which shows use of an Iub bearer for a Multimedia Broadcast/Multicast Service (MBMS) which is shared among plural cells served by a Node-B.

The present invention is described in the non-limiting, example context of a telecommunications system 10 shown in FIG. 3. The telecommunications system 10 includes a radio access network (RAN) 11 which, in a non-limiting illustrated example embodiment, can be a Universal Mobile Telecommunications (UMTS) Terrestrial Radio Access Network (UTRAN). The radio access network (RAN) 11 comprises node(s) which are capable of receiving transmissions from a MBMS Service Context (BM-SC) 12.

The telecommunications system 10 further includes one or more core network service nodes 14 (such as a SGSN and/or GGSN node, both a GGSN node and a SGSN node being depicted in FIG. 3). A core network node such as GGSN node is situated and configured to receive transmissions from MBMS Service Context (BM-SC) 12. In this regard, MBMS Service Context (BM-SC) 12 can itself situated in the core network 14 (e.g., as a core network node), or situated externally to the core network 14 as shown in FIG. 3.

The radio access network (RAN) 11 includes one or more radio network controllers (RNCs) 26. Each radio network controller node 26 is connected over an interface (such as the Iu interface when radio access network (RAN) 11 is a UTRAN) to appropriate core network node(s). Each radio network controller node 26 is also connected (in UTRAN, over an interface Iub) to one or more base stations (BS) 28 and likely to one or more other RNCs in radio access network (RAN) 11. Those skilled in the art will also appreciate that a radio base station a base station, a Node B, or B-node, all such terms being used interchangeably herein.

For sake of simplicity, the radio access network (RAN) 11 of FIG. 3 is shown with only one RNC node 26 and one base station node 28. The base stations 28 communicate with mobile station(s) or user equipment unit(s) 30 over a radio or air interface 32. In the example embodiment of FIG. 3, radio base station 28 serves plural cells, three such cells $C_1$, $C_2$, and $C_3$ being illustrated for sake of example. The service of plural cells by a single radio base station 28 is facilitated by the same radio base station having, e.g., different transceivers for the respective, different cells.

Each of the radio interface 32, the Iu interface, the Iur interface, and the Iub interface is shown by dash-dotted lines in FIG. 3.

By way of example, FIG. 3 shows a representative user equipment unit 30 situated in each cell. That is, user equipment unit 30, is currently served by cell $C_1$, user equipment unit $30_2$ is currently served by cell $C_2$, and user equipment unit 303 is currently served by cell $C_3$. It will be appreciated that typically many user equipment units are in each cell, and that a transmission of data for a Multimedia Broadcast/Multicast Service (MBMS) session can be provided essentially simultaneously to each of the plural user equipment units which have requested participation in the particular Multimedia Broadcast/Multicast Service (MBMS) session. That is, all the user equipment units in a cell simultaneously listen to the MTCH in the cell which carries the MBMS session.

Figure 4:
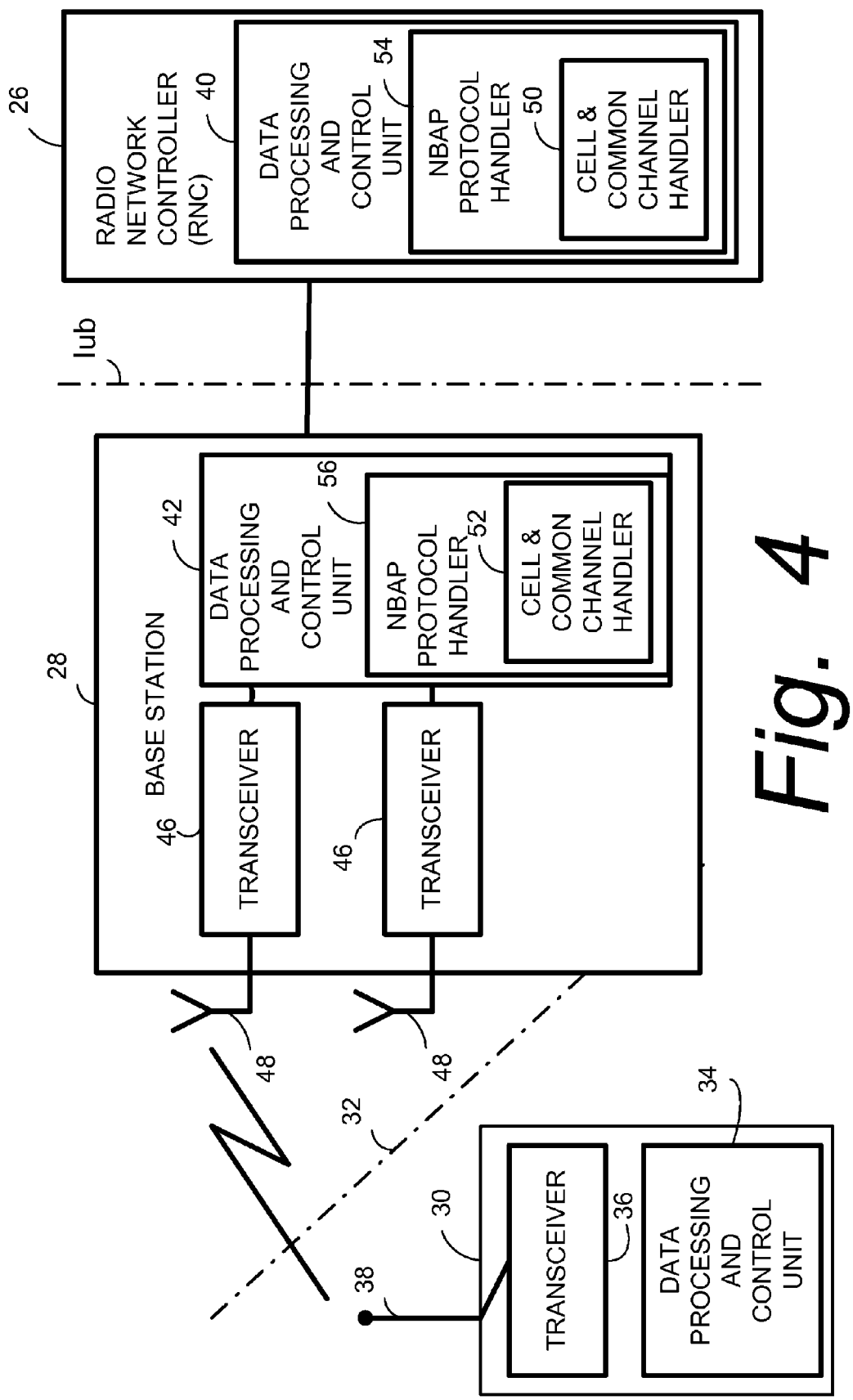
FIG. 4 is a simplified function block diagram of a portion of a radio access network (RAN) including a user equipment unit (UE) station; a radio network controller; and a base station.

FIG. 4 shows selected general aspects of user equipment unit (UE) 30 and illustrative nodes such as radio network controller 26 and base station 28. The user equipment unit (UE) 30 shown in FIG. 4 includes a data processing and control unit 34 for controlling various operations required by the user equipment unit (UE). The UE's data processing and control unit 34 provides control signals as well as data to a radio transceiver 36 connected to an antenna 38.

The example radio network controller 26 and base station 28 as shown in FIG. 4 are radio network nodes that each include a corresponding data processing and control unit 40 and 42, respectively, for performing numerous radio and data processing operations required to conduct communications between the RNC 26 and the user equipment units (UEs) 30 via the radio base station 28. Part of the equipment controlled by the base station data processing and control unit 40 includes plural radio transceivers 46 connected to one or more antennas 48.

For facilitating use of the Multimedia Broadcast/Multicast Service (MBMS), the radio network controller node 26 includes a cell and common channel handler 50. Likewise, radio base station 28 includes cell and common channel handler 52.

The cell and common channel handler 50 of radio network controller node 26 can be realized by the previously-described Common Transport Channel Management function which is included in the previously-described NBAP Protocol. For this reason, in the example implementation of FIG. 4, the cell and common channel handler 50 is shown as being included in a NBAP Protocol handler 54 for radio network controller node 26. In similar fashion, the common channel handler 52 is shown as being included in a NBAP Protocol handler 56 for radio base station 28. In the illustrated example implementation, one or both of the NBAP Protocol handler 54 (and thus the cell and common channel handler 50 encompassed thereby) and NBAP Protocol handler 56 can comprise the respective data processing and control units 40 and 42, which can be (for example) a controller or processor in the sense of those terms having been previously broadly defined.

Figure 1:
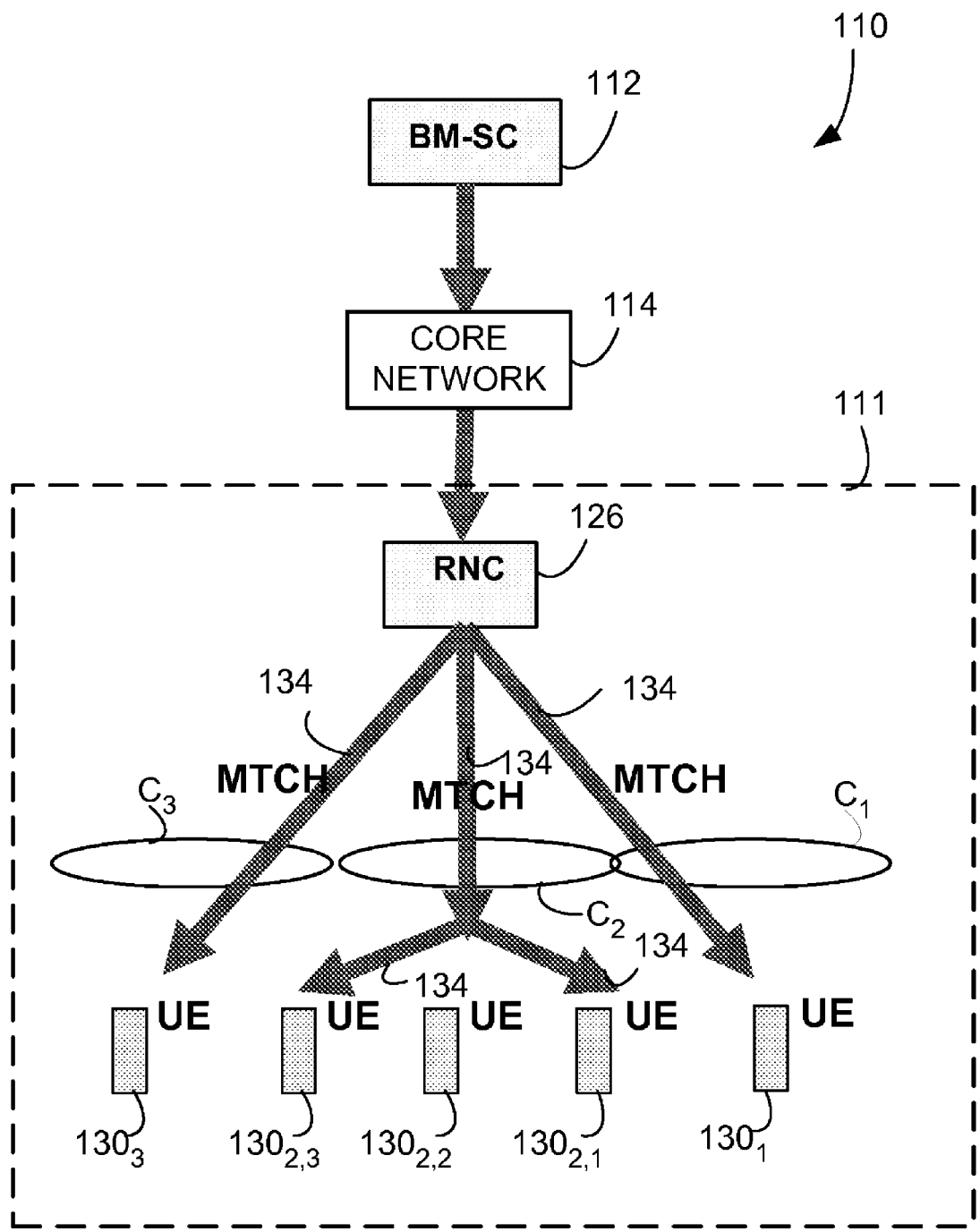
FIG. 1 is a diagrammatic view of a telecommunications system which facilitates a Multimedia Broadcast/Multicast Service (MBMS).
Figure 2:
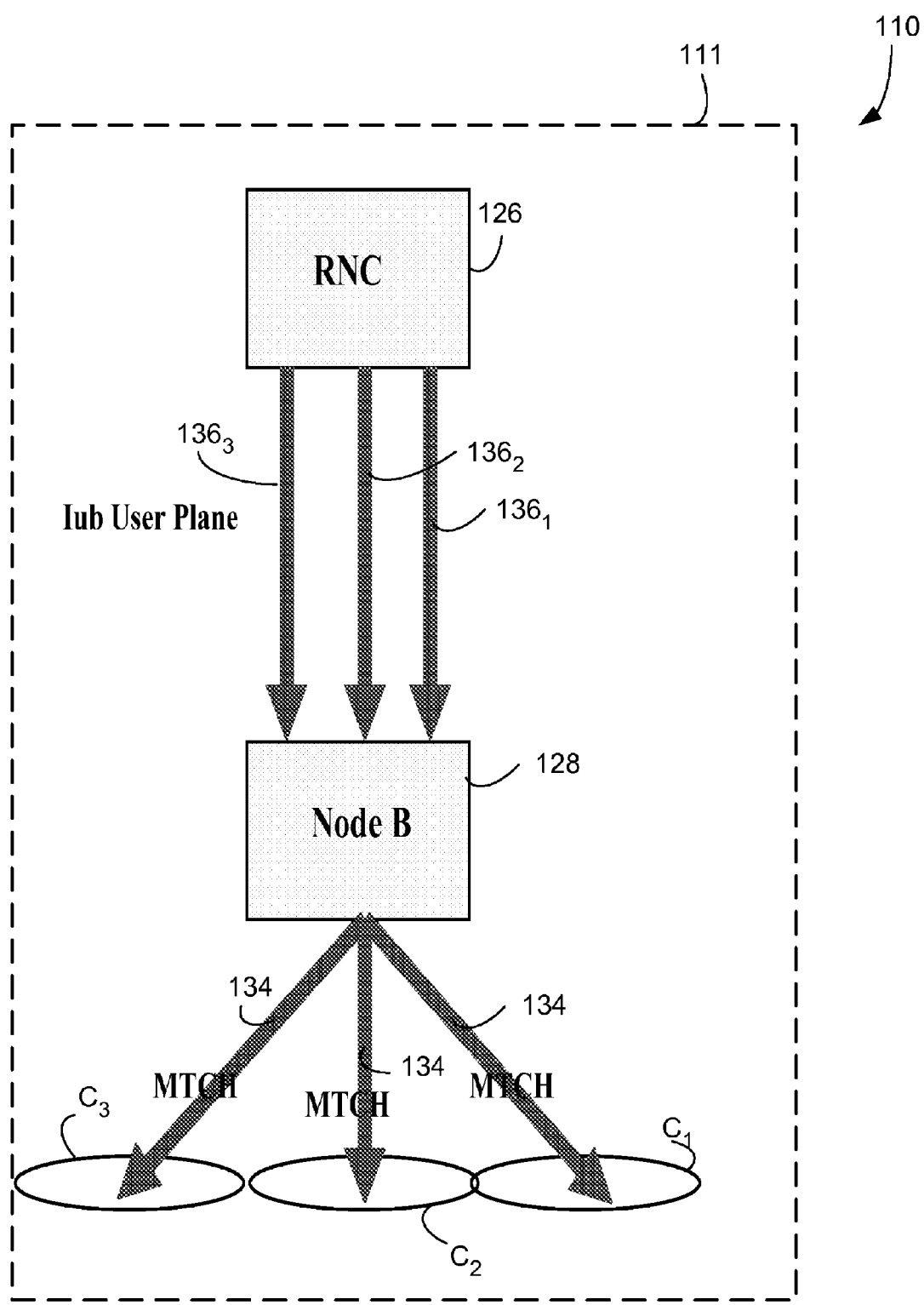
FIG. 2 is a diagrammatic view of the telecommunications system of FIG. 1 and particularly showing use of plural Iub bearers for a Multimedia Broadcast/Multicast Service (MBMS).

In various embodiments of the technology described herein, the existing Common Transport Channel Setup procedure is modified to use a same Iub user plane resource for multiple cells in a Node B, e.g., in radio base station 28. In this regard, FIG. 3 shows a single Iub user plane resource, e.g., common transport bearer 60, which carries user data for a Multimedia Broadcast/Multicast Service (MBMS) session to user equipment units located in plural ones of the cells served by radio base station 28. By way of example, FIG. 3 shows common transport bearer 60 carrying user data for a Multimedia Broadcast/Multicast Service (MBMS) session to user equipment unit $30_1$ in cell $C_1$, user equipment unit $30_2$ in cell $C_2$, and user equipment unit $30_3$ in cell $C_3$. The use of a single common transport bearer 60 for carrying user data for a Multimedia Broadcast/Multicast Service (MBMS) session to user equipment units in plural cells in the manner shown in FIG. 3 is in contrast to the conventional use of plural Iub bearers 136 (one for each cell) as illustrated in FIG. 2.

It will be appreciated that the common transport bearer 60 can be utilized to carry user data for a Multimedia Broadcast/Multicast Service (MBMS) session to user equipment units in plural cells, and that in this context "plural" means two or more. While three cells are illustrated in FIG. 3, the common transport bearer 60 could alternatively be utilized for user equipment units in two cells served by radio base station 28, or four or more cells served by radio base station 28 as well.

Further, the person skilled in the art will also understand that reception of the Multimedia Broadcast/Multicast Service (MBMS) session is not limited to one user equipment unit per cell, but that plural user equipment units can receive the Multimedia Broadcast/Multicast Service (MBMS) session in each of the plural cells.

The name MTCH (MBMS Transport channel) is used in relation to MBMS functionality, but in reality one MTCH channel is carried by one FACH channel over the air interface. Over the Iub interface, the data stream of each FACH channel is carried by an Iub transport bearer, i.e., the common transport bearer 60. In the present technology, one Iub transport bearer can be used for multiple FACHs/MTCHs in different cells.

FIG. 3 further illustrates that the user data for a Multimedia Broadcast/Multicast Service (MBMS) session, having been provided to radio base station 28 via a single common transport bearer 60 for all cells, is distributed in each cell over a unique MTCH for each cell. For this reason, FIG. 3 shows MTCH $62_1$ for cell $C_1$, MTCH $62_2$ for cell $C_2$, and MTCH $62_3$ for cell $C_3$.

Figure 5:
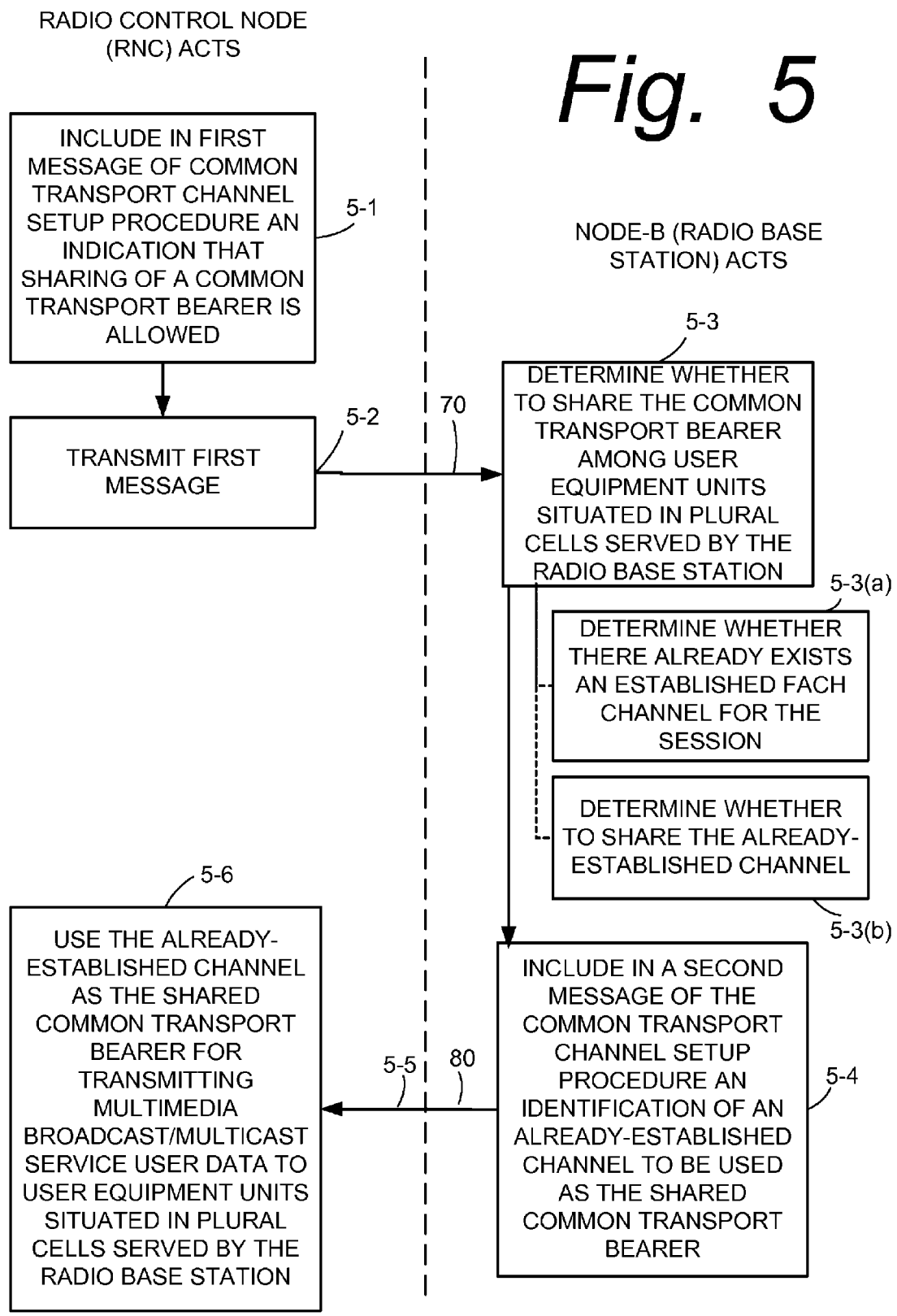
FIG. 5 is a diagrammatic diagram depicting example acts performed in a Common Transport Channel Setup Procedure according to an example mode of operation.

FIG. 5 illustrates example, generic, representative acts performed in conjunction with a method of operating a radio access network (such as radio access network (RAN) 11) for facilitating transmission of a Multimedia Broadcast/Multicast Service to plural user equipment units served by a radio base station such as radio base station 28. The acts of the method of FIG. 5 are performed after a MBMS Session Start Request, and include execution of a Common Transport Channel Setup procedure as described herein. Acts of FIG. 5 performed by the radio network controller node 26 can be performed, e.g., by cell and common channel handler 50, and similarly acts of FIG. 5 performed by radio base station 28 can be performed, e.g., by cell and common channel handler 52.

Figure 6:
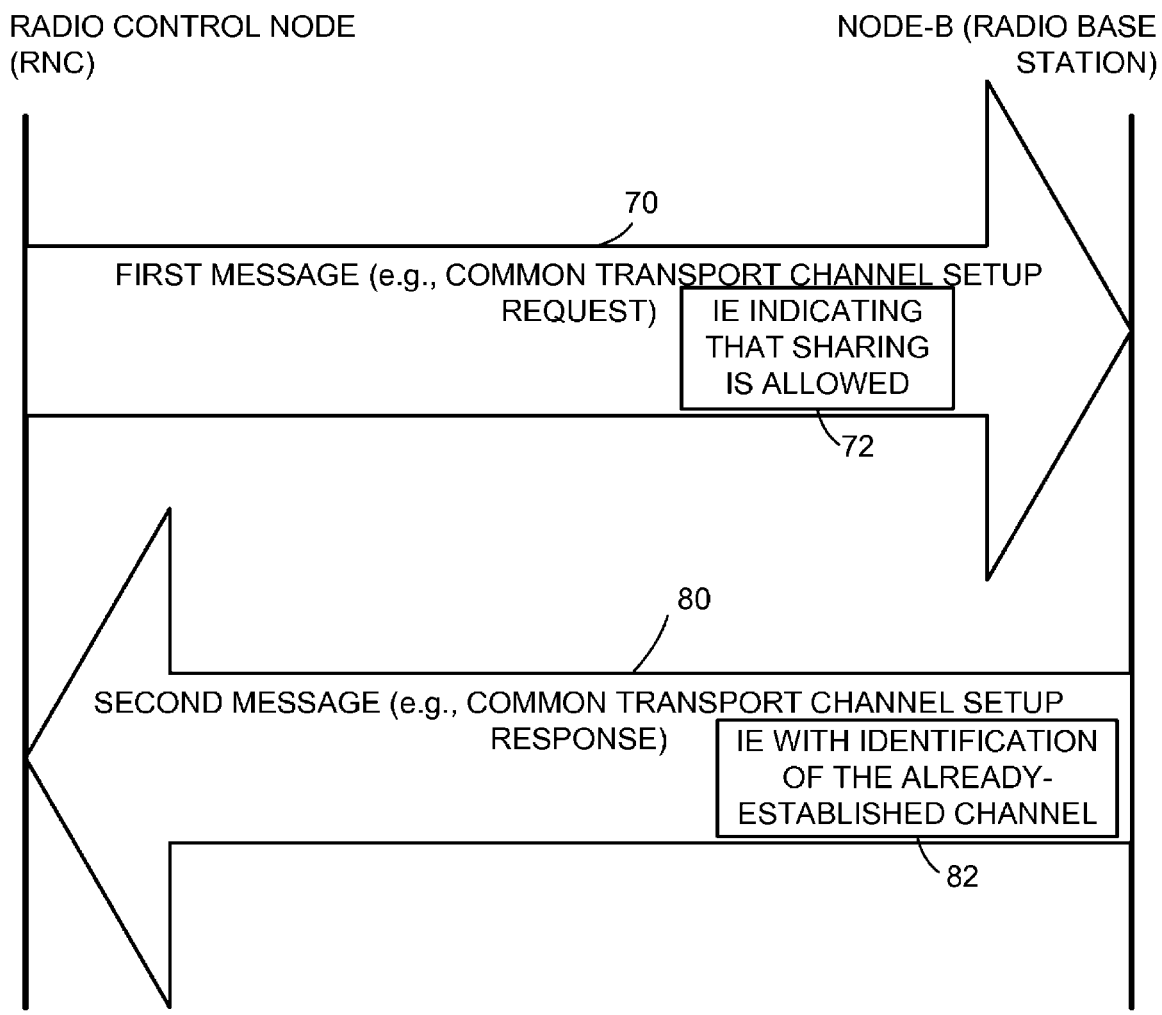
FIG. 6 is a diagrammatic view example messages included in a Common Transport Channel Setup Procedure according to an example mode of operation.

Whereas FIG. 5 depicts example acts of the example method, FIG. 6 shows transmission of example messages involved in the method. It should be kept in mind that (as previously explained) a separate Common Transport Channel Setup procedure is required to establish MTCHs in different cells. In other words, if MTCHs to be establish in three cells $C_1$-$C_3$ served by the same Node-B, then three separate Common Transport Channel Setup Request messages are initiated by the radio network controller node, one such message for each cell. The example acts of FIG. 5 are therefore discussed in the context of performance of one Common Transport Channel Setup procedure without specifying whether that one Common Transport Channel Setup procedure is a first such Common Transport Channel Setup procedure performed for the radio base station 28, or whether one or more such procedures involving the radio base station 28 have already been performed.

FIG. 5 depicts as act 5-1 the radio network controller node 26 including in a first message 70 of a Common Transport Channel Setup procedure an indication that sharing of a common transport bearer involved in a session of the Multimedia Broadcast/Multicast Service is allowed. Act 5-2 of FIG. 5, as well as FIG. 6, show transmission of the first message 70 from radio network controller node 26 to radio base station 28. In an example implementation, the first message 70 can be, for example, a COMMON TRANSPORT CHANNEL SETUP REQUEST.

Act 5-3 of the example method of FIG. 5 shows radio base station 28 making a determination whether to share the common transport bearer 60 among user equipment units situated in plural cells served by the radio base station 28. If the determination of act 5-3 is positive, as act 5-4 the radio base station 28 includes in a second message 80 of the Common Transport Channel Setup procedure an identification of an already-established channel to be used as the shared common transport bearer. Act 5-5 shows radio base station 28 sending the second message 80 of the Common Transport Channel Setup procedure to radio network controller node 26. In an example implementation the second message 80 can be, for example, a COMMON TRANSPORT CHANNEL SETUP RESPONSE.

As act 5-6 of the example method of FIG. 5, the radio network controller 26 uses the already-established channel as the shared common transport bearer for transmitting Multimedia Broadcast/Multicast Service user data to user equipment units situated in plural cells served by the radio base station.

In an example embodiment, the radio base station makes its determination of act 5-3 by performing subacts. As example subact 5-3(*a*), the radio base station 28 determines whether there already exists an established Iub transport bearer for the session of the Multimedia Broadcast/Multicast Service. That is, as subact 5-3(*a*) the radio base station 28 determines whether a Common Transport Channel Setup procedure has already been performed for another cell served by radio base station 28 (which resulted in an already-established channel). As example subact 5-3(*b*), the radio base station 28 determines whether to share the already-established Iub transport bearer based on various capability and structural considerations, such as (for example) internal hardware and/or software structure of the radio base station.

The technology supports both ATM and IP transport options. In both (ATM and IP) transport cases the base station may include transport layer address and binding id of the already established channel additionally to cell ID and common transport channel ID of already established channel.

In an example implementation, the radio network controller (RNC) includes an information element 72 in the first message of a Common Transport Channel Setup procedure to indicates that the sharing of the common transport bearer is allowed, in the manner shown in FIG. 6. The information element 72 can be a new information element for the first message of a Common Transport Channel Setup procedure. Further, the radio base station includes in an information element 82 of the second message of the Common Transport Channel Setup procedure the identification of the already-established channel to be used as the shared common transport bearer.

By including the Broadcast Common Transport Bearer IE 72 (or a similar IE) the CRNC 26 indicates that splitting is allowed in RBS 28. The Broadcast Common Transport Bearer IE 72 includes a reference IE that uniquely identifies the MBMS session among all ongoing MBMS sessions in the radio base station 28 (Node B) or radio network subsystem (RNS).

The technology also allows the flexibility and freedom to the radio network controller node 26 and to the radio base station 28 as to whether to support this common transport bearer functionality based on such factors as their internal hardware and/or software capabilities. For example, as act 5-3(*b*) of FIG. 5 the radio base station 28 can optionally make a determination whether to share the already-established channel based on various capability and structural considerations, such as (for example) internal hardware and/or software structure of the radio base station. Such considerations involved in the share or not share determination can include the fact, degree, or extent of either or both hardware or software resource fragmentation at the radio base station 28. For example, a radio base station 28 having a hardware and/or software structure which uses pooled hardware and/or software resources for common transport channels in multiple cells is more likely to agree to sharing of the common transport bearer 60 (e.g., splitting of use of the common transport bearer 60 among plural cells). On the other hand, a radio base station 28 having a hardware and/or software structure which uses dedicated hardware and/or software resources for common transport channels per cell is less likely to agree to sharing of the common transport bearer 60.

In the above regard, in practice it can occur that a radio base station 28 has a mix of pool resources and dedicated resources. Each hardware and software resource typically has limited capacity (e.g., each hardware or software resource can handle a maximum number N of cells with M common transport channels in each cell). If the radio base station 28 supports more than one cell, then the radio base station 28 has more than one resource unit. Accordingly, in such situation if the capacity limit of a particular resource unit has been attained, then the additional comparable resource units can be deployed for new cells/common transport channels. In some situations there might not be a common distribution point or any coordination function between the resource units that would allow the split (e.g., sharing) for the new common transport channel. Thus, at reception of the COMMON TRANSPORT CHANNEL SETUP REQUEST message the radio base station 28 (Node B) may decide on sharing (e.g., splitting) of the transport bearer 60 for two or more cells in Node B, depending on internal hardware and/or software structure.

As mentioned in conjunction with act 5-3(*b*), the radio base station 28 checks the Broadcast Reference information element (e.g., information element 72 of message 70. If there is already an established FACH channel with same reference, and if it is possible or desirable to use the same transport bearer, then the radio base station 28 indicates in the MBMS Common Transport Bearer Information Response IE 82 the C-ID and Common Transport Channel ID of one of the already established FACH channel in the COMMON TRANSPORT CHANNEL SETUP RESPONSE. As an alternative, the Node B, may indicate the transport resource identity, i.e. Transport layer Address (TLA) and Binding ID of the already-established FACH channel in the COMMON TRANSPORT CHANNEL SETUP RESPONSE.

At reception of the COMMON TRANSPORT CHANNEL SETUP RESPONSE, the RNC uses the transport bearer of the indicated FACH channel in case the radio base station 28 (Node B) supports the splitting (e.g., sharing) of common transport bearer 60.

In the case of IP transport, same procedure is used as described previously. However, since the CRNC (e.g., radio network controller node 26) is not aware of the split possibility in Node B in advance, the radio network controller node 26 always allocates the TLA/Binding ID (IP Address/UDP port number) for the FACH transport bearer and includes these parameters in the first message 70 (e.g., the COMMON TRANSPORT CHANNEL SETUP REQUEST message). However, if the splitting is possible and radio base station 28 indicates (in the Broadcast Common Transport Bearer Information Response IE 82 (of second message 80, e.g., the COMMON TRANSPORT CHANNEL SETUP RESPONSE)) the C-ID and Common Transport Channel ID of an already-established FACH channel, then the radio base station 28 releases the allocated TLA/Binding ID (IP Address/UDP port number) in the RNC and uses the IP Address/UDP port number of the transport bearer of the indicated FACH channel.

The transport bearer in the case of IP transport is defined by source and destination UDP ports, and source and destination IP addresses. Hence, in order to support an alternative method of indicating the existing transport resource identity, the radio network controller node 26 has to allocate the local transport bearer termination point identity the same as to one of the existing FACH carrying MTCH. Hence that option could limit the freedom of the radio base station 28 to select the common transport bearer. Therefore the explicit capability to indicate the common transport bearer via Radio Network Layer identities is superior.

By the solution and technology provided herein, in all Request messages, the radio network controller node indicates whether it is allowed to share the transport bearer for this MTCH with other MTCHs that carry same MBMS session. This gives the radio network controller node (RNC) and the radio base station (RBS, e.g., the Node-B) the freedom to decide (on a per MTCH basis) whether to use same Iub bearer or not, depending on the hardware and/or software capabilities of the nodes. Due to this freedom, this solution provides good backward compatibility with RNC/RBS nodes that do not support this functionality.

Although various embodiments have been shown and described in detail, the claims are not limited to any particular embodiment or example. None of the above description should be read as implying that any particular element, step, act, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A method of operating a radio access network for facilitating transmission of a Multimedia Broadcast/Multicast Service to plural user equipment units served by a radio base station, the method comprising:
   (1) including in a first message of a Common Transport Channel Setup procedure from a radio network controller node to the radio base station an indication that sharing of a common transport bearer involved in a session of the Multimedia Broadcast/Multicast Service is allowed;
   (2) making a determination, at the radio base station and in dependence upon internal structure of the radio base station, whether or not to share the common transport bearer and to share, over the common transport bearer, data for a Multimedia Broadcast/Multicast Service session among user equipment units situated in plural cells served by the radio base station; and, if the determination of act (2) is positive,
   (3) including in a second message of the Common Transport Channel Setup procedure sent from the radio base station to the radio network controller an identification of an already-established channel to be used as the shared common transport bearer.

2. The method of claim 1, further comprising the radio network controller using the already-established channel as the shared common transport bearer for transmitting Multimedia Broadcast/Multicast Service user data to user equipment units situated in plural cells served by the radio base station.

3. The method of claim 1, wherein act (1) comprises including an information element in the first message of a Common Transport Channel Setup procedure which indicates that the sharing of the common transport bearer is allowed; and wherein act (3) comprises including in an information element of the second message of the Common Transport Channel Setup procedure the identification of the already-established channel to be used as the shared common transport bearer.

4. The method of claim 1, wherein the identification of the already-established channel includes a cell ID and common transport channel ID of the already-established channel.

5. The method of claim 1, wherein the determination of act (2) includes determining whether there already exists an established transport bearer for the session of the Multimedia Broadcast/Multicast Service.

6. The method of claim 1, wherein the determination of act (2) is dependent upon internal hardware and/or software structure of the radio base station.

7. The method of claim 1, wherein the already-established channel to be used as the shared common transport bearer existed prior to the determination of act (2).

8. The method of claim 1, wherein the Common Transport Channel Setup procedure is an industry specified procedure.

9. The method of claim 8, wherein the Common Transport Channel Setup procedure is a 3GPP TS 25.433-specified Common Transport Channel Setup procedure.

10. The method of claim 1, wherein the determination is made on a per cell basis.

11. A control node of a radio access network configured to indicate in a first message of a Common Transport Channel Setup procedure from a radio network controller node to a radio base station that sharing of a common transport bearer involved in a session of the Multimedia Broadcast/Multicast Service is allowed and, upon receiving a predetermined response to the first message reflecting a determination by a radio base station in dependence on internal structure of the radio base station whether or not the common transport bearer and data for a Multimedia Broadcast/Multicast Service session carried by the common transport bearer can be shared, to use an already-established channel as the shared common transport bearer for transmitting Multimedia Broadcast/Multicast Service user data to user equipment units situated in plural cells served by the radio base station.

12. The control node of claim 11, wherein the predetermined response to the first message is an identification of the already-established channel, and wherein the identification of the already-established channel comprises a cell ID and common transport channel ID of the already-established channel.

13. The control node of claim 11, wherein the already-established channel existed prior to the determination by the radio base station.

14. The control node of claim 11, wherein the Common Transport Channel Setup procedure is an industry specified procedure.

15. The control node of claim 14, wherein the Common Transport Channel Setup procedure is a 3GPP TS 25.433-specified Common Transport Channel Setup procedure.

16. The control node of claim 11, wherein the determination is made by the base station node on a per cell basis.

17. A radio base station of a radio access network configured to determine in dependence on internal structure of the radio base station whether or not a common transport bearer utilized in a Multimedia Broadcast/Multicast Service and data for a Multimedia Broadcast/Multicast Service session carried by the common transport bearer can be shared among user equipment units situated in plural cells served by the radio base station and, if the determination is positive, to indicate in a message of a Common Transport Channel Setup procedure sent from the radio base station to the radio network controller an identification of an already-established channel to be used as the shared common transport bearer.

18. The radio base station of claim 17, wherein the identification of the already-established channel comprises a cell ID and common transport channel ID of the already-established channel.

19. The radio base station of claim 17, wherein the radio base station is configured to:
(i) determine whether there already exists an established transport bearer for the session of the Multimedia Broadcast/Multicast Service; and
(ii) determine whether to share the already-established transport bearer based on internal hardware and/or software structure of the radio base station.

20. The radio base station of claim 17, wherein the radio base station is configured to include in an information element of the message of the Common Transport Channel Setup procedure the identification of the already-established channel to be used as the shared common transport bearer.

21. The radio base station of claim 17, wherein the already-established channel existed prior to the determination by the radio base station.

22. The radio base station of claim 17, wherein the Common Transport Channel Setup procedure is an industry specified procedure.

23. The radio base station of claim 22, wherein the Common Transport Channel Setup procedure is a 3GPP TS 25.433-specified Common Transport Channel Setup procedure.

24. The radio base station of claim 17, wherein the radio base station is configured to determine on a per cell basis whether or not the common transport bearer can be shared.

25. A radio access network utilized in conjunction with a Multimedia Broadcast/Multicast Service, the network comprising:
a radio base station;
a radio network controller node configured to indicate in a first message of a Common Transport Channel Setup procedure from the radio network controller node to the radio base station that sharing of a common transport bearer involved in a session of the Multimedia Broadcast/Multicast Service is allowed;
wherein the radio base station is configured to make a determination in dependence on internal structure of the radio base station whether or not to share the common transport bearer and to share, over the common transport bearer, data for a Multimedia Broadcast/Multicast Service session among user equipment units situated in plural cells served by the radio base station; and, if the determination is positive, to include in a second message of the Common Transport Channel Setup procedure sent from the radio base station to the radio network controller an identification of an already-established channel to be used as the shared common transport bearer.

26. The radio access network of claim 25, wherein the radio network controller is further configured to use the already-established channel as the shared common transport bearer for transmitting Multimedia Broadcast/Multicast Service user data to user equipment units situated in plural cells served by the radio base station.

27. The radio access network of claim 25, wherein the identification of the already-established channel includes a cell ID and common transport channel ID of the already-established channel.

28. The radio access network of claim 25, wherein the radio base station is configured to:
(i) determine whether there already exists an established transport bearer for the session of the Multimedia Broadcast/Multicast Service; and
(ii) determine whether to share the already-established transport bearer based on internal hardware and/or software structure of the radio base station.

29. The radio access network of claim 25, wherein the radio base station is configured to include in an information element of the second message of the Common Transport Channel Setup procedure the identification of the already-established channel to be used as the shared common transport bearer.

30. The radio access network of claim 27, wherein the already-established channel existed prior to the determination by the radio base station.

31. The radio access network of claim 25, wherein the Common Transport Channel Setup procedure is an industry specified procedure.

32. The radio access network of claim 31, wherein the Common Transport Channel Setup procedure is a 3GPP TS 25.433-specified Common Transport Channel Setup procedure.

33. The radio access network of claim 25, wherein the radio base station is configured to determine on a per cell basis whether or not the common transport bearer can be shared.

* * * * *

UNITED STATES PATENT AND TRADEMARK OFFICE
CERTIFICATE OF CORRECTION

PATENT NO. : 7,949,354 B2
APPLICATION NO. : 11/555336
DATED : May 24, 2011
INVENTOR(S) : Amirijoo et al.

It is certified that error appears in the above-identified patent and that said Letters Patent is hereby corrected as shown below:

On Title Page 2, Item (56), under "OTHER PUBLICATIONS", in Column 2, Line 19, delete "(Jun. 2000)," and insert -- (Jun. 2006), --, therefor.

In Column 1, Line 23, delete "Tub" and insert -- Iub --, therefor.

In Column 2, Line 17, delete "Tub bearer" and insert -- Iub bearer --, therefor.

In Column 2, Line 17, delete "over an Tub" and insert -- over an Iub --, therefor.

In Column 2, Line 20, delete "the Tub" and insert -- the Iub --, therefor.

In Column 2, Line 20, delete "for Tub" and insert -- for Iub --, therefor.

In Column 3, Line 5, delete "ID TEs," and insert -- ID IEs, --, therefor.

In Column 3, Line 5, delete "adress" and insert -- address --, therefor.

In Column 3, Line 26, delete "know" and insert -- known --, therefor.

In Column 3, Line 26, delete "Tub" and insert -- Iub --, therefor.

In Column 3, Line 36, delete "Tub transport" and insert -- Iub transport --, therefor.

In Column 3, Line 36, delete "Tub bearer" and insert -- Iub bearer --, therefor.

In Column 4, Line 20, delete "in" and insert -- (in --, therefor.

In Column 4, Line 22, delete "procedure" and insert -- procedure) --, therefor.

Signed and Sealed this
Seventh Day of February, 2012

David J. Kappos
*Director of the United States Patent and Trademark Office*

CERTIFICATE OF CORRECTION (continued)
U.S. Pat. No. 7,949,354 B2

In Column 4, Line 65, delete "Tub" and insert -- Iub --, therefor.

In Column 6, Line 59, delete "30," and insert -- $30_1$ --, therefor.

In Column 6, Line 61, delete "303" and insert -- $30_3$ --, therefor.

In Column 14, Line 32, in Claim 30, delete "claim 27," and insert -- claim 25, --, therefor.